UNITED STATES PATENT OFFICE.

TOM J. SUGIMOTO, OF SAN FRANCISCO, CALIFORNIA.

RICE FOOD.

1,198,304.     Specification of Letters Patent.     Patented Sept. 12, 1916.

No Drawing. Application filed September 29, 1915, Serial No. 53,172. Renewed August 14, 1916. Serial No. 114,891.

*To all whom it may concern:*

Be it known that I, TOM J. SUGIMOTO, a citizen of the United States, residing at San Francisco, in the county of San Francisco and State of California, have invented new and useful Improvements in Food Preparations, of which the following is a specification.

The object of the present invention is to provide a food preparation which can be preserved for an indefinite period and will then require cooking for a very short time to render it edible and paltable.

In manufacturing my improved food preparation, I take glutinous rice, otherwise known as pop rice, which when steamed will pop or explode in a slight degree somewhat like pop corn. This rice is soaked in water for twenty-four hours and is afterward steamed for about one-half of an hour. By the steaming it expands and becomes soft, and then sugar is added in the proportion by weight of one of sugar to three of rice, Any desired flavor, such as vanilla, lemon or the like, may be added when mixing it with the sugar. The mixture is then ground by any suitable means until it is all of a very fine and smooth consistency. It is then rolled out in a thin flat cake and is cut up into small strips and allowed to dry. These strips, if protected from moisture, will remain in a good condition for a great many years, and at the end of that time will be found ready for the final cooking.

To produce the cooked product from the cakes or strips, said cakes or strips are simply subjected to heat, either in the oven, or by dipping in oil and frying them, or by cooking in any other suitable manner. The time required for cooking is about one minute and a half. When subjected to cooking the strip expands very rapidly to about twice its length, breadth and thickness, so that it occupies about eight times the original space. The cooked product is very palatable, extremely wholesome and easily digested.

I claim:—

1. A food preparation comprising glutinous rice steamed, mixed with sugar and reduced to the form of thin, flat, dry strips.

2. A food preparation comprising glutinous rice steamed, mixed with sugar and flavoring material and reduced to the form of thin, flat, dry strips.

3. The method of making a food preparation which consists in steaming glutinous rice, mixing it with sugar in the proportion of about one-fourth of the whole, grinding the mixture to a fine and smooth consistency, reducing the mixture to a thin flat cake, cutting the cake into strips, and drying the strips.

4. The method of making a food preparation which consists in steaming glutinous rice, mixing it with flavoring material and with sugar in the proportion of about one-fourth of the whole, grinding the mixture to a fine and smooth consistency, reducing the mixture to a thin flat cake, cutting the cake into strips, and drying the strips.

In testimony whereof I have hereunto set my hand in the presence of two subscribing witnesses.

TOM J. SUGIMOTO.

Witnesses:
    F. M. WRIGHT,
    D. B. RICHARDS.